(12) United States Patent
Masuda et al.

(10) Patent No.: US 8,427,407 B2
(45) Date of Patent: Apr. 23, 2013

(54) ON-VEHICLE FLAT DISPLAY APPARATUS

(75) Inventors: Hideki Masuda, Niigata (JP); Tatsuki Kawamura, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 773 days.

(21) Appl. No.: 12/595,871

(22) PCT Filed: Apr. 1, 2008

(86) PCT No.: PCT/JP2008/056454
§ 371 (c)(1),
(2), (4) Date: Oct. 14, 2009

(87) PCT Pub. No.: WO2008/129924
PCT Pub. Date: Oct. 30, 2008

(65) Prior Publication Data
US 2010/0127958 A1    May 27, 2010

(30) Foreign Application Priority Data

Apr. 18, 2007 (JP) ................ 2007-108784
Sep. 14, 2007 (JP) ................ 2007-239027

(51) Int. Cl.
*G09G 3/34* (2006.01)
*G01L 19/12* (2006.01)
*G01D 13/22* (2006.01)
*G01D 11/28* (2006.01)
*B60Q 1/00* (2006.01)

(52) U.S. Cl.
USPC ............ 345/84; 116/271; 116/286; 116/288; 116/328; 362/27; 362/489

(58) Field of Classification Search .............. None
See application file for complete search history.

(56) References Cited

U.S. PATENT DOCUMENTS

| | | | | |
|---|---|---|---|---|
| 4,878,453 A | * | 11/1989 | Inoue et al. | 116/288 |
| 5,295,049 A | * | 3/1994 | Terada | 362/27 |
| 6,827,034 B1 | * | 12/2004 | Paulo | 116/286 |

FOREIGN PATENT DOCUMENTS

| | | |
|---|---|---|
| JP | 06-117878 | 4/1994 |
| JP | 06117878 A * | 4/1994 |
| JP | 2003-161650 | 6/2003 |
| JP | 2003161650 A * | 6/2003 |
| JP | 2005-331317 | 12/2005 |

* cited by examiner

*Primary Examiner* — Alexander S Beck
*Assistant Examiner* — Kirk Hermann
(74) *Attorney, Agent, or Firm* — McDermott, Will & Emery LLP

(57) ABSTRACT

An on-vehicle display apparatus with an increased flat display size. The on-vehicle display apparatus includes a flat display capable of displaying various types of information, a light-transmitting substrate provided on a front-face side of the flat display, a pointer provided in the light-transmitting substrate, and a pointer drive means provided on a back-face side of the flat display. The pointer drive means rotates the pointer. The apparatus further includes a movement mechanism for moving the light-transmitting substrate to the outside of a display range. A first magnet is provided for the pointer, and a second magnet is provided for the pointer drive means and is configured to be opposite to first magnet.

6 Claims, 7 Drawing Sheets

A—A (a)

(b)

(a)

(b)

ON-VEHICLE FLAT DISPLAY APPARATUS

RELATED APPLICATIONS

This application is the U.S. National Phase under 35 U.S.C. §371 of International Application No. PCT/JP2008/056454, filed on Apr. 1, 2008, which in turn claims the benefit of Japanese Application No. 2007-108784, filed on Apr. 18, 2007 and Japanese Application No. 2007-239027, filed Sep. 14, 2007, the disclosures of which Applications are incorporated by reference herein.

TECHNICAL FIELD

The present invention relates to an on-vehicle display apparatus which includes a display called a flat display such as a liquid crystal display and a practical meter located on a front face of the flat display and having a pointer.

BACKGROUND ART

A conventional on-vehicle display apparatus has been disclosed in Patent Document 1. The on-vehicle display apparatus has a display (flat display) capable of displaying various states and a practical meter located on a front face of the display. The practical meter includes a dial provided with indications such as scales and a pointer provided in front of the dial, allows the pointer to point at a position in accordance with measurements so that an observer can recognize the measurements visually through matching of an indicating portion of the pointer with the indications. The apparatus also has a movement means for moving the practical meter to a position where the meter and the display do not overlap.

The movement means moves the practical meter to the position where the meter and the display do not overlap when the display is preferentially displayed.

Patent Document 1: JP-A-2005-331317

DISCLOSURE OF THE INVENTION

Problems that the Invention is to Solve

In such an on-vehicle display apparatus, the practical meter is moved to the position where the meter and the display do not overlap. However, the practical meter is moved within the display range of the on-vehicle display apparatus and the movement range is limited, thereby presenting the problem of the limited size of the display to result in poor marketability.

The present invention has been made in view of the problem and it is an object thereof to provide an on-vehicle display apparatus in which the limit to the size of a flat display is suppressed to enhance the marketability.

Means for Solving the Problems

To solve the problems, the present invention includes a flat display capable of displaying various types of information, a light-transmitting substrate provided on a front-face side of the flat display, a pointer provided in the light-transmitting substrate, a pointer drive means provided on a back-face side of the flat display for rotating the pointer, a movement mechanism for moving the light-transmitting substrate to the outside of a display range, a first magnet provided for the pointer, and a second magnet provided for the pointer drive means to be opposite to the first magnet, characterized in that, when the light-transmitting substrate is positioned on the front-face side of the flat display, the pointer is rotated in association with rotation drive of the pointer drive means by attraction force of the first and second magnets.

The present invention is characterized in that the pointer is formed to have such a weight balance as to point at a predetermined position when the light-transmitting substrate is moved to the outside of the display range by the movement mechanism.

The present invention is characterized in that a shaft portion rotatably supporting the pointer is located in the light-transmitting substrate, the shaft portion includes a main shaft, a main-shaft receive portion securing the main shaft to the light-transmitting substrate, a rotation shaft portion provided rotatably about the main shaft and located on and secured to the pointer, and an elastic member located between the main-shaft portion and the rotation shaft portion, when the light-transmitting substrate is positioned on the front-face side of the flat display, the first and second magnets attract each other to deform the elastic member to make the rotation shaft portion rotatable, and when the light-transmitting substrate is moved to the outside of the display range by the movement mechanism, the elastic member is restored to hold the rotation shaft portion non-rotatable.

The present invention is characterized in that the main shaft has a holding member in contact with the rotation shaft portion by the action of the elastic member when the light-transmitting substrate is moved to the outside of the display range by the movement mechanism.

The present invention is characterized in that each of the first and second magnets has two poles magnetized on a surface opposite to each other, and when the light-transmitting substrate is moved to the outside of the display range by the movement mechanism, the pointer drive means rotates the pointer such that magnetic pole boundaries of the first and second magnets are substantially parallel with the movement direction of the light-transmitting substrate.

An on-vehicle display apparatus according to claim 5, characterized in that the pointer drive means does not perform rotation drive for the time period from the movement of the light-transmitting substrate to the outside of the display range to the return of the first magnet to the position where the attraction is produced with the second magnet.

Advantage of the Invention

The present invention relates to an on-vehicle display apparatus which includes a display called a flat display such as a liquid crystal display and a practical meter located on a front face of the flat display and having a pointer and can suppress the limit to the size of the flat display to enhance the marketability.

Figure 1:
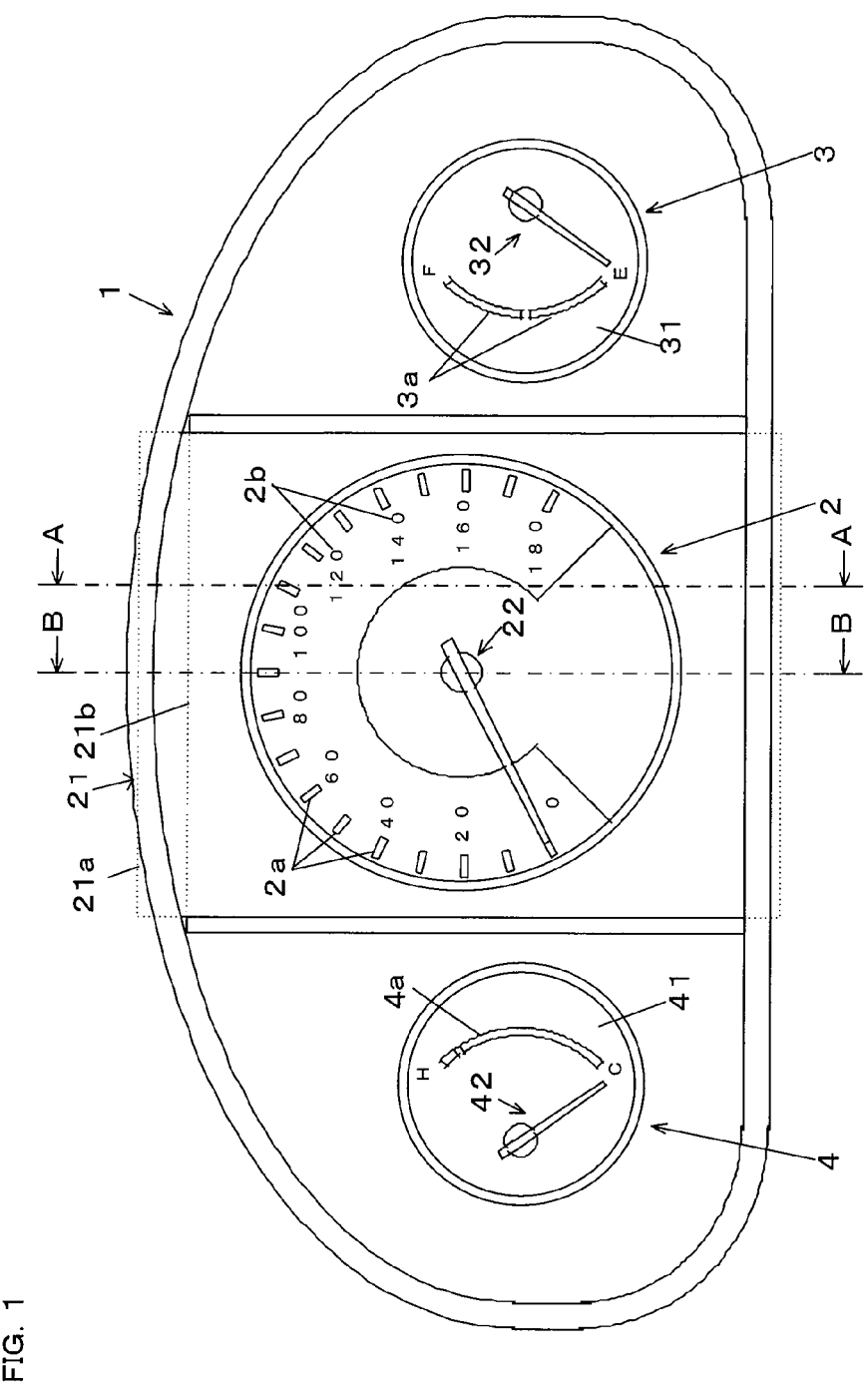
[FIG. 1] A front view showing a first embodiment of the present invention.

DESCRIPTION OF REFERENCE NUMERALS AND SIGNS 21 display plate
21a light-transmitting substrate
21b liquid crystal display (flat display)
22 pointer
22a pointer body
22b pointer cap
22c first magnet
22d first yoke
22e light-receive portion
22f insertion portion
23 shaft portion
23a main shaft
23b main-shaft receive portion
23c rotation shaft portion
23d spring (elastic member)
23e holding portion
24 LED
25 bearing portion
25a second magnet
25b second yoke
26 stepping motor
27 circuit substrate
28 movement mechanism

BEST MODE FOR CARRYING OUT THE INVENTION

In the following, a first embodiment in which the present invention is applied to a vehicle combination meter (on-vehicle display apparatus) will be described with reference to the accompanying drawings.

In FIG. 1, reference numeral 1 shows a housing. The housing 1 has a shade member and a case body to accommodate three indicators (practical meters), that is, a speed meter 2, a fuel meter 3, and a water-temperature meter 4. The speed meter 2 is larger than the fuel meter 3 and the water-temperature meter 4 and is placed between the fuel meter 3 and the water-temperature meter 4. The speed meter 2 has a display plate 21 and a pointer 22. The fuel meter 3 and the water-temperature meter 4 have dials 31, 41, and pointers 32, 42, respectively. The dials 31, 41 are provided by forming light-shield portions through printing on substrates made of light-transmitting resin (for example, polycarbonate) except for indicating portions 3a, 4a, respectively. The pointers 32, 42 are rotated by a stepping motor (not shown) to point at the indicating portions 3a, 4a of the dials 31, 41, respectively.

Of the three indicators, the fuel meter 3 and the water-temperature meter 4 have conventionally known structures, so that description there of is omitted. The characteristics of the present invention will be described with reference to the speed meter 2.

Figure 2:
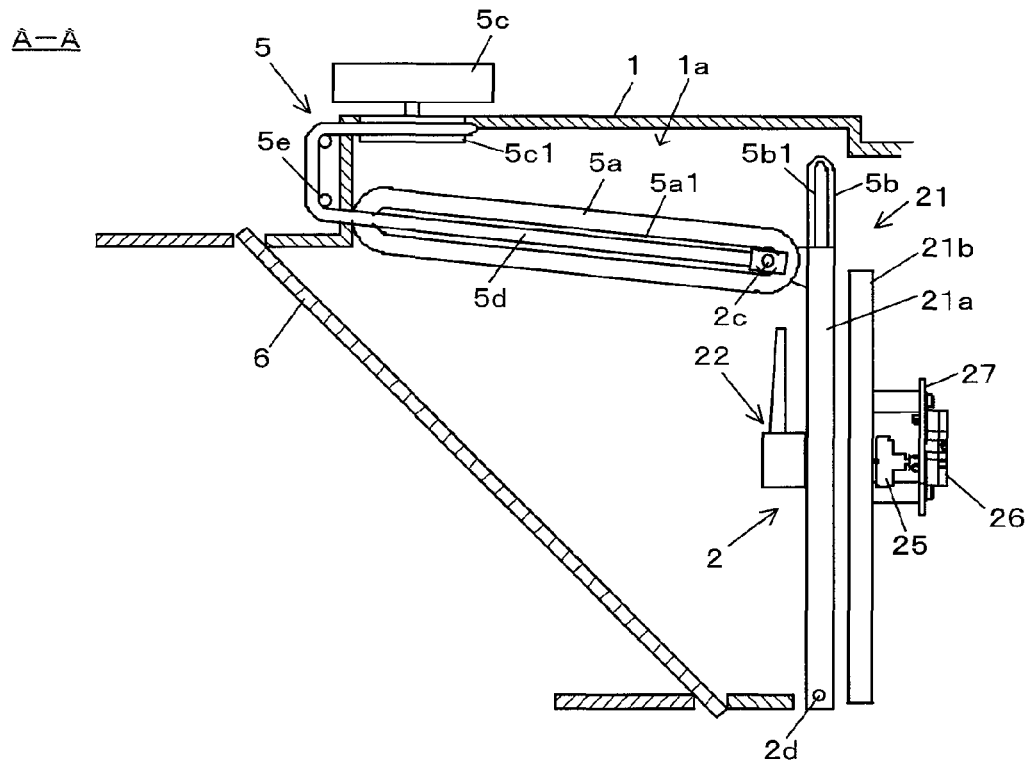
[FIG. 2] A section view showing the first embodiment of the present invention.
Figure 3:
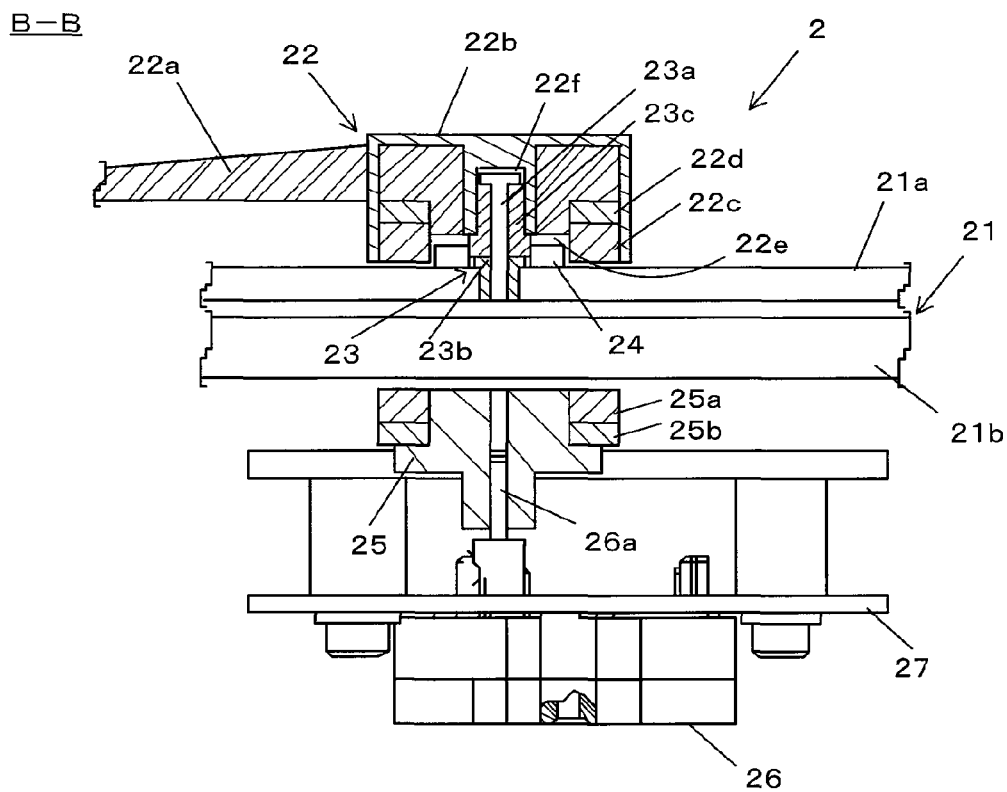
[FIG. 3] An enlarged section view of main portions to show the first embodiment of the present invention.

FIG. 2 is a section view showing the embodiment, and FIG. 3 is an enlarged section view showing main portions. In FIGS. 2 and 3, the speed meter 2 has the display plate 21, the pointer 22, a shaft portion 23, an LED 24, a bearing portion 25, and the stepping motor 26. Reference numeral 27 shows a circuit substrate on which the stepping motor 26 is mounted. In FIG. 2, reference numeral 5 shows a movement mechanism and reference numeral 6 shows a front-face panel of a dark color.

The display plate 21 is formed of a light-transmitting substrate 21a and a liquid crystal display (flat display) 21b.

The light-transmitting substrate 21a is made of light-transmitting resin (for example, acrylic or polycarbonate), on which the shaft portion, later described, for rotatably holding the pointer 22 is located. The light-transmitting substrate 21a is movable to the outside of a display region together with the pointer 22 by the movement mechanism 5, later described in detail.

The liquid crystal display 21b is provided by sealing-in liquid crystal between a pair of light-transmitting substrates having a transparent electrode film formed thereon to provide a liquid crystal cell and then bonding a polarizing plate onto both surfaces of the liquid crystal cell. For example, a liquid crystal display element of dot-matrix type is used. The liquid crystal display 21b can display variable contents and can display at least an indicating portion 2a and a character portion 2b when the light-transmitting substrate 21a and the pointer 22 are positioned on a front-face side of the liquid crystal display 21b. The image displayed by the liquid crystal display 21b is displayed through the light-transmitting substrate 21a.

The pointer 22 has a pointer body 22a, a pointer cap 22b, a first magnet 22c, and a first yoke 22d, and points at the indicating portion 2a displayed by the liquid crystal display 21b.

The pointer body 22a is made of light-transmitting resin such as polycarbonate, and the pointer cap 22b is fitted at a rotation center portion thereof. The rotation center portion of the pointer body 22a has a recess portion formed therein for inserting the first magnet 22c and the first yoke 22d. The pointer body 22a also has a light-receive portion 22e for receiving illumination light from the LED 24 placed on the light-transmitting substrate 21a to illuminate the pointer body 22a. The light-receive portion 22e is formed to be positioned in a void portion of the ring-shaped first magnet 22c and first yoke 22d.

The pointer cap 22b is provided by forming non-light-transmitting resin, for example ABS resin, into a substantially tubular shape. The pointer cap 22b holds the first magnet 22c and the first yoke 22d pressed therein. In a central portion of the pointer cap 22b, an insertion portion 22f is provided for inserting the shaft portion 23 which rotatably supports the pointer 22.

The first magnet 22c is formed in a ring shape and includes a plurality of S poles and N poles alternately magnetized. The first magnet 22c and a second magnet 25a, later described, attract each other.

The first yoke 22d is provided on the side of the first magnet 22c which the other side of the first magnet 22c faces the second magnet 25a (the non-opposite surface). The first yoke 22d constitutes a magnet circuit which suppresses leakage flux from the non-opposite surface of the first magnet 22c to improve the magnet efficiency.

The shaft portion 23 has a main shaft 23a, a main-shaft receive portion 23b, and a rotation shaft portion 23c, and rotatably supports the pointer 22. The main shaft 23a is a member of a substantially cylindrical shape which is inserted into a hole portion formed in the main-shaft receive portion 23b and the rotation shaft portion 23c to serve as the rotation center of the pointer 22. The main-shaft receive portion 23b is located in a recess portion formed in the light-transmitting substrate 21a to secure the main shaft 23a to the light-transmitting substrate 21a. The rotation shaft portion 23c is provided rotatably about the main shaft 23a and is inserted into the insertion portion 22f of the pointer cap 22b together with the main shaft 23a to be pressed and held in the pointer cap 22b. Each of the members 23a to 23c constituting the shaft portion 23 is made of a non-magnetic material such as aluminum and brass, for example.

The bearing portion 25 has the second magnet 25a and a second yoke 25b and is fitted to a rotation shaft 26a of the stepping motor 26. The pointer drive means in the embodiment is formed of the bearing portion 25 and the stepping motor 26.

The second magnet 25a is placed at the opposite position to the first magnet 22c with the display plate 21 interposed between them to form a pair with the first magnet 22c. The second magnet 25a includes a plurality of S poles and N poles alternately magnetized similarly to the first magnet. The second magnet 25a may be provided in a method in which the bearing portion 25 is formed with plastic magnet and the portion thereof opposite to the first magnet 22c is magnetized, or in a method in which the second magnet 25a is formed with a different member from the bearing portion 25 and then insert molding or outsert molding is performed for integral formation.

The second yoke 25b is provided closer to a surface of the second magnet 25a that is not opposite to the first magnet 22c (the non-opposite surface). The second yoke 25b constitutes a magnet circuit which suppresses leakage flux from the non-opposite surface of the second magnet 25a to improve the magnet efficiency.

In FIG. 2, guide pins 2c, 2d are provided at the top and bottom of the light-transmitting substrate 21a on both sides thereof. The guide pins 2c, 2d guide the movement of the light-transmitting substrate 21a.

The movement mechanism 5 is mainly formed of guide rails 5a, 5b which guide the guide pins 2c, 2d for the light-transmitting substrate 21a, respectively, a motor 5c which serves as a driving source for moving the light-transmitting substrate 21a, and a wire 5d which serves a connecting member for connecting the light-transmitting substrate 21a to the motor 5c. Reference numeral 5e shows a roller which guides the wire 5d.

The guide rail 5a is made of metal and is fixed to the on-vehicle display apparatus D by an appropriate means. The guide rail 5a has a through hole 5a1 through which the guide pin 2c passes. The guide rail 5a is provided substantially perpendicular to a plate-face direction of the liquid crystal display 21b.

The guide rail 5b is made of synthetic resin and is formed integrally with the housing 1. The guide rail 5b has a groove 5b1 along which the guide pin 2d moves. The guide rail 5b is provided substantially parallel with the plate-face direction of the liquid crystal display 21b.

The motor 5c has a roller 5c1 for winding the wire 5d thereon. One end of the wire 5d is fixed to the roller 5c1. The motor 5c is driven to rotate and wind the wire 5d, thereby moving the light-transmitting substrate 21a.

The wire 5d is made of metal. The one end thereof is fixed to the roller 5c1 of the motor 5c and the other end is fixed to the guide pin 2c for the light-transmitting substrate 21a. The connecting member for connecting the light-transmitting substrate 21a to the motor 5c is not limited to the wire.

Figure 4:
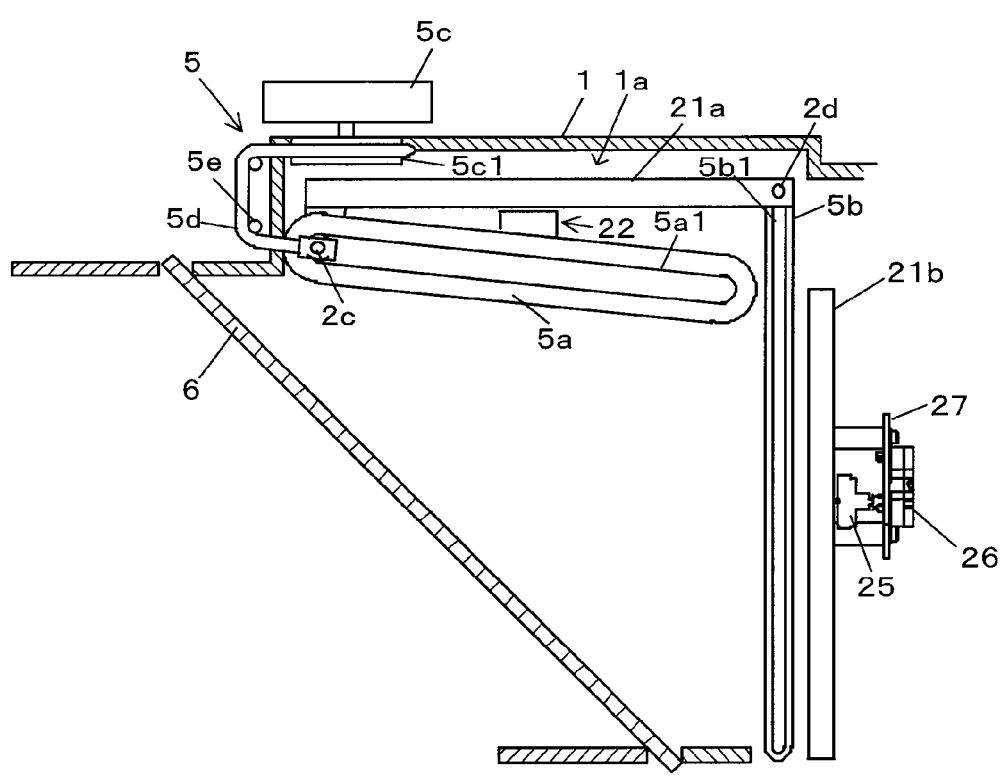
[FIG. 4] A section view for explaining movement of a light-transmitting substrate in the first embodiment of the present invention.

In the movement mechanism 5, the motor 5c is driven to rotate and wind the wire 5d to move the light-transmitting substrate 21a. The light-transmitting substrate 21a is placed substantially parallel with the plate-face direction of the liquid crystal display 21b before the wire 5d is wound (see FIG. 2), and when the wire 5d is wound, the substrate 21a is rotated substantially perpendicularly while moving upward and thus moved to the outside of the display range (see FIG. 4). The display range is defined by the housing 1 and refers to the range which can be visually recognized by a user when viewed substantially perpendicularly to the plate-face direction of the liquid crystal display 21b. In the movement to the outside of the display range, the light-transmitting substrate 21a and the pointer 22 are accommodated by an accommodating portion 1a provided in the housing 1. In the embodiment, the pointer 22 is entirely accommodated by the accommodating portion 1a and cannot be recognized visually in the display range. It is not essential that the entire pointer 22 cannot be visually recognized as in the embodiment, and part of the pointer 22 may be visually recognized to the extent that display of the liquid crystal display 21b is not affected.

Figure 5:
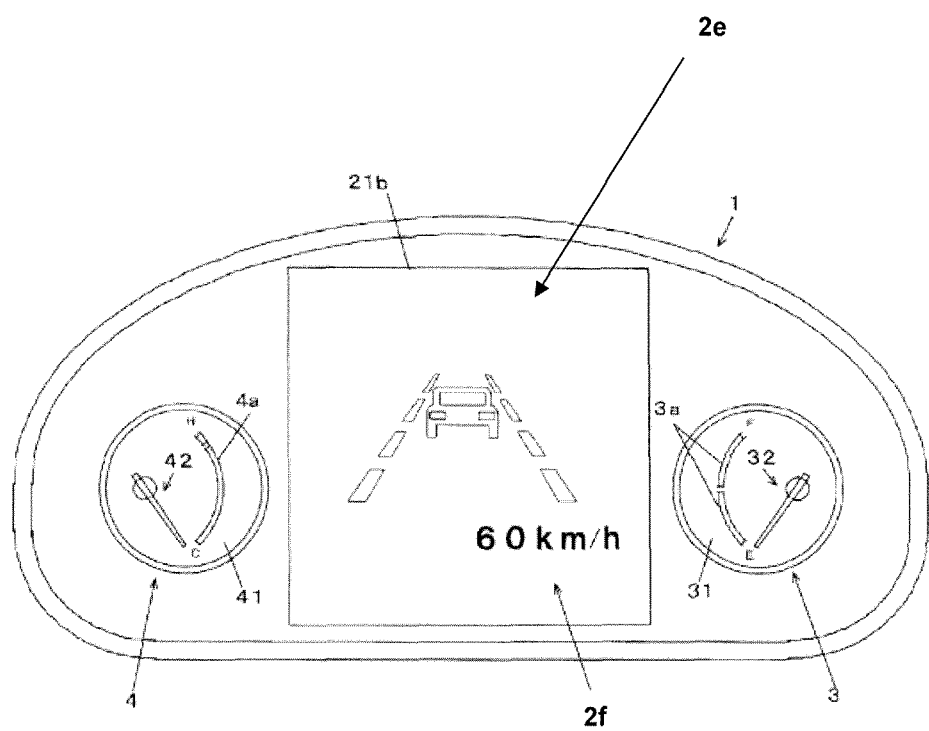
[FIG. 5] A front view showing a display example in the first embodiment of the present invention.

With the structure as described above, since the pointer 22 is moved to the outside of the display range together with the light-transmitting substrate 21a, the display size of the liquid crystal display 21b can be increased to ensure a wide display area for the liquid crystal display 21b. The user can instantaneously read the display contents of the liquid crystal display 21b by virtue of the liquid crystal display 21b having the larger display size. FIG. 5 is a diagram showing a display example on the liquid crystal display 21b when the light-transmitting substrate 21a is moved to the outside of the display range. In FIG. 5, the liquid crystal display 21b displays a front alarm information 2e which notifies an approach to a car ahead and a vehicle speed information 2f.

When the pointer 22 is moved to the outside of the display range together with the light-transmitting substrate 21a, the pointer 22 is released from the attraction force of the first and second magnets 22c, 25a. If the pointing position of the pointer 22 is not clearly settled at this point, the pointing position after the light-transmitting substrate 21a is again moved into the display range (front-face side of the liquid crystal display 21b) is displaced from the previous pointing position to cause an out-of-phase state of the pointer 22. To solve the problem, the pointer 22 is formed to have such a weight balance as to point at a predefined position (for example, the origin position) when the light-transmitting substrate 21a is moved to the outside of the display range, that is, when the pointer 22 is released from the magnetic force of the second magnet 25a. Since the pointer 22 is formed as described above, the pointer 22 can maintain the same pointing position at all times when the pointer 22 is moved to the outside of the display range together with the light-transmitting substrate 21a. The pointer 22 can be held in a fixed direction when the light-transmitting substrate 21a is again moved into the display range. This can prevent the out-of-phase state of the pointer 22. The weight balance of the pointer 22 is determined as appropriate in accordance with the material, size, shape, and the like of each of the members of the pointer 22.

Next, a second embodiment of the present invention will be described. The components identical or corresponding to those in the abovementioned first embodiment are designated with the same reference numerals and detailed description thereof is omitted.

The second embodiment differs from the first embodiment in the structure of the shaft portion 23 for rotatably supporting the pointer 22. When the pointer 22 is moved to the outside of the display range together with the light-transmitting substrate 21a, the pointer 22 is released from the attraction force of the first and second magnets 22c, 25a. If the pointing position of the pointer 22 is not clearly settled at this point, the pointing position after the light-transmitting substrate 21a is again moved into the display range (front-face side of the liquid crystal display 21b) is displaced from the previous pointing position to cause an out-of-phase state of the pointer 22. To solve the problem, the shaft portion 23 is structured as below.

Figure 6:
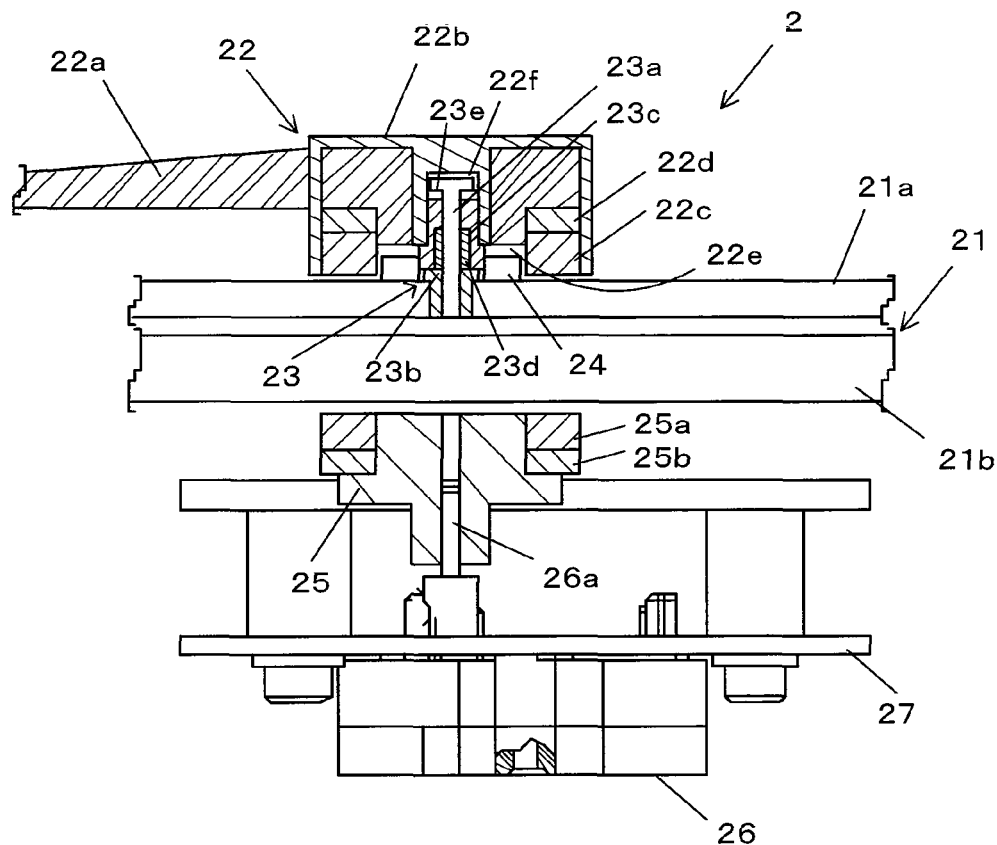
[FIG. 6] An enlarged section view of main portions to show a second embodiment of the present invention.
Figure 7:
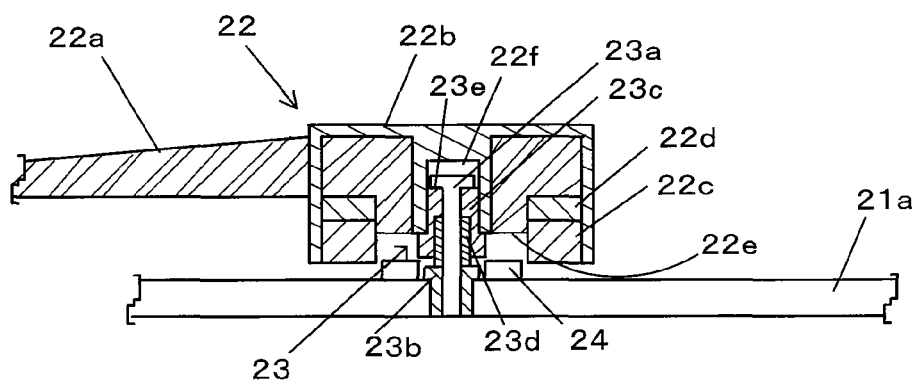
[FIG. 7] An enlarged section view of main portions for explaining the action of a spring in the second embodiment of the present invention.

As shown in FIGS. 6 and 7, the shaft portion 23 has the main shaft 23a, the main-shaft receive portion 23b, the rotation shaft portion 23c, and a spring (elastic member) 23d, and rotatably supports the pointer 22. The main shaft 23a is a member of a substantially cylindrical shape which is inserted into a hole portion formed in the main-shaft receive portion 23b and the rotation shaft portion 23c to serve as the rotation center of the pointer 22. The main-shaft receive portion 23b is located in a recess portion formed in the light-transmitting substrate 21a to secure the main shaft 23a to the light-transmitting substrate 21a. The rotation shaft portion 23c is provided rotatably about the main shaft 23a and is inserted into the insertion portion 22f of the pointer cap 22b together with the main shaft 23a to be pressed and held in the pointer cap 22b. The spring 23d is an elastic member which can expand and contract and is located between the rotation shaft portion 23c and the main-shaft receive portion 23b. As shown in FIG. 6, when the light-transmitting substrate 21a is positioned on the front-face side of the liquid crystal display 21b, that is, when the pointer 22 is opposed to the bearing portion 25 with the light-transmitting substrate 21a and the liquid crystal display 21b interposed between them, the first and second magnets 22c, 25a attract each other to press and contract the spring 23d against the rotation shaft portion 23c, thereby producing a space between the rotation shaft portion 23c and a protrusive holding portion 23e provided in the top end portion of the main shaft 23a to make the pointer 22 rotatable. As shown in FIG. 7, when the light-transmitting substrate 21a is moved to the outside of the display range by the movement mechanism 5, the spring 23d is released from the attraction force of the first and second magnet 22c, 25a and is returned to its original shape to press the rotation shaft portion 23c against the holding portion 23e to hold the rotation shaft portion 23c non-rotatable. The holding portion 23e is desirably formed such that the portion thereof in contact with the rotation shaft portion 23c has a wave shape or a member having a large frictional force such as rubber is desirably placed in order to increase the frictional force with the rotation shaft portion 23c. Each of the members 23a to 23d constituting the shaft portion 23 is made of a non-magnetic material such as aluminum and brass, for example.

With the shaft portion 23 structured as above, when the pointer 22 is moved to the outside of the display range together with the light-transmitting substrate 21a, the pointing position of the pointer 22 is held at the pointing position before the movement. When the light-transmitting substrate 21a is again moved into the display range, the pointing position is not displaced from the previous pointing position and thus an out-of-phase state of the pointer 22 can be prevented Next, a third embodiment of the present invention will be described. The components identical or corresponding to those in the abovementioned embodiments are designated with the same reference numerals and detailed description thereof is omitted.

Figure 8:
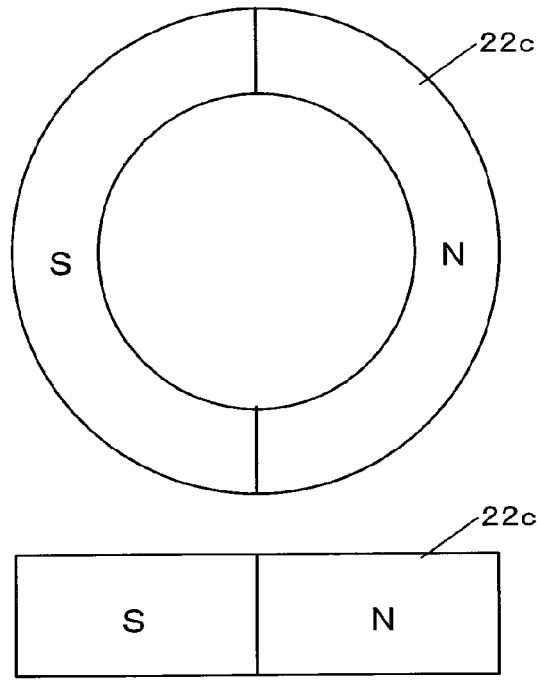
[FIG. 8] A diagram showing a first magnet in a third embodiment of the present invention.
Figure 9:
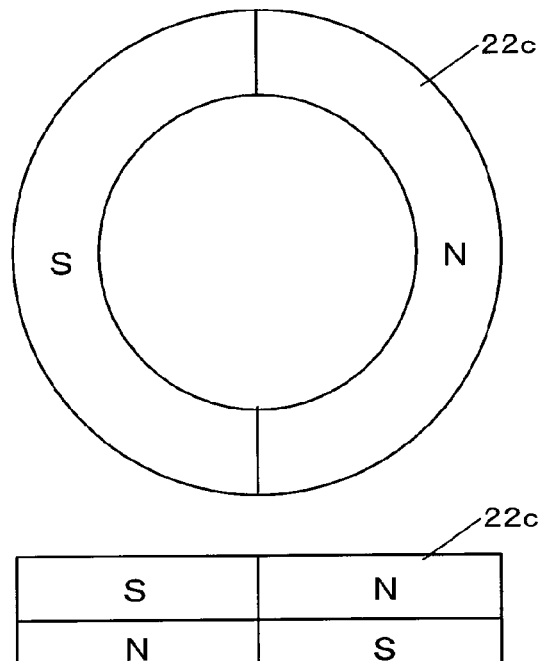
[FIG. 9] A diagram showing another example of the first magnet in the third embodiment of the present invention.

The third embodiment differs from the abovementioned embodiments in that each of the first and second magnets 22c, 25a formed in a ring shape includes two magnetized poles on its opposite surface, and when the light-transmitting substrate 21a is moved to the outside of the display range by the movement mechanism 5, the pointer drive means rotates the pointer 2 such that the magnetic pole boundaries of the first and second magnets 22c, 25a are substantially parallel with the movement direction of the light-transmitting substrate 21a. FIG. 8 shows the first magnet 22c. FIG. 8(a) is a diagram of the first magnet 22c viewed from the surface opposite to the second magnet 23a, and FIG. 8(b) is a diagram of the first magnet 22c viewed from the side (the curved surface side). The first magnet 22c includes two magnetized poles on the opposite surface. In the third embodiment, it is essential only that the first magnet 22c should include two magnetized poles on the opposite surface. As shown in FIG. 9, the first magnet 22c may include two different poles magnetized on both planes. Although not shown, the second magnet 25a also includes two magnetized poles on the surface opposite to the first magnet 22c similarly to the first magnet 22c.

Figure 10:
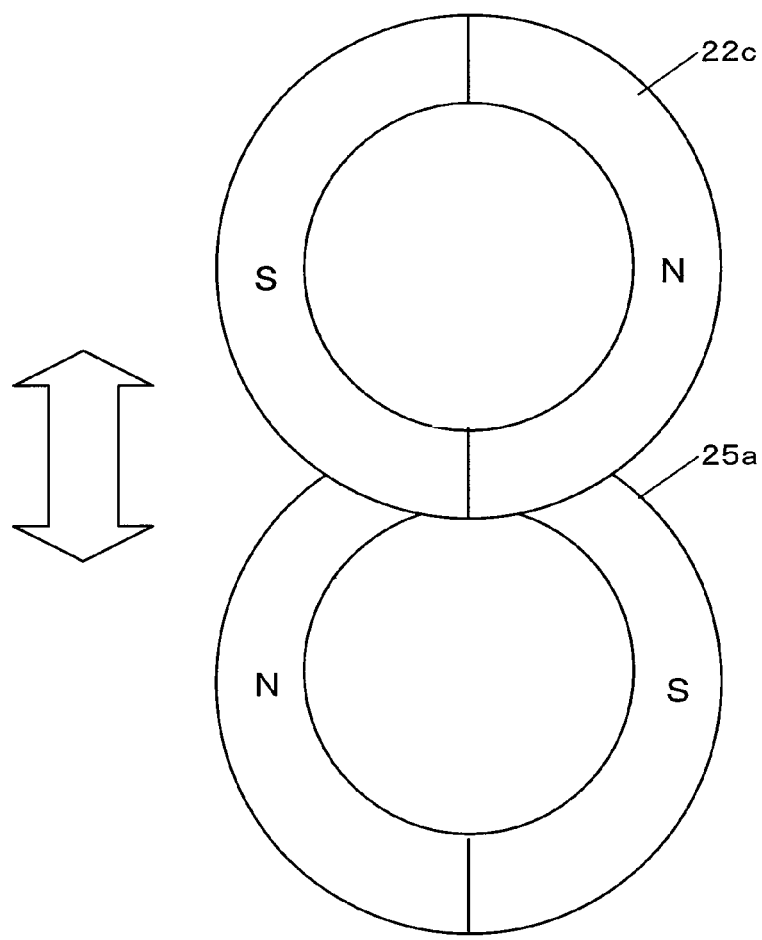
[FIG. 10] A diagram showing a first magnet and a second magnet in the third embodiment of the present invention.

In the third embodiment, for moving the light-transmitting substrate 21a to the outside of the display range by the movement mechanism 5, the pointer drive means formed of the bearing portion 25 and the stepping motor 26 first rotates the pointer 22 to cause the pointer 22 to point at a position such that the magnetic pole boundaries of the first and second magnets 22c, 25a are substantially parallel with the movement direction of the light-transmitting substrate 21a by the movement mechanism 5. Then, the light-transmitting substrate 21a is moved to the outside of the display range by the movement mechanism 5. At this point, as shown in FIG. 10, the first magnet 22c is moved together with the light-transmitting substrate 21a substantially parallel with the magnetic pole boundaries of the first and second magnets 22c, 25a from the position opposite to the second magnet 25a. If the movement direction of the first magnet 22c is not parallel with the first and second magnets 22c, 25a, the magnetic force of the first and second magnets 22c, 25a produces rotation torque when the first and second magnets 22c, 25a are separated, thereby presenting the problem of causing fluctuations in the pointing position of the pointer 22. To address this, the first magnet 22c is moved substantially parallel with the magnetic pole boundaries of the first and second magnets 22c, 25a to allow suppression of the occurrence of the rotation torque to prevent the fluctuations in the pointing position of the pointer 22. The pointer 22 is formed to have such a weight balance as to continue pointing at the same position when the light-transmitting substrate 21a is moved to the outside of the display range, that is, when the pointer 22 is released from the magnetic force of the second magnet 25a. The pointer drive means does not perform rotation drive for the time period from the movement of the light-transmitting substrate 21a to the outside of the display range to the return of the first magnet 22c to the position where the attraction is produced with the second magnet 25a. This can suppress the occurrence of the rotation torque due to the magnetic force when the light-transmitting substrate 21a and the pointer 22 are again moved to the display range, so that the fluctuations in the pointing position of the pointer 22 can be prevented.

While the movement mechanism 5 moves the light-transmitting substrate 21a upward in the embodiment, the movement may be downward or leftward or rightward. While the accommodating portion 1a is provided in an upper portion of the on-vehicle combination meter, it may be provided in a lower portion.

While the first and second magnets 22c, 25a are permanent magnets in the embodiment, the second magnet 25a may be an electromagnet, for example. An organic EL display may be used as the flat display in addition to the liquid crystal display 21b. While the stepping motor 26 is included as the pointer drive means, it goes without saying that a cross-coil movement may be used, for example, instead of the stepping motor.

Industrial Applicability

The present invention is preferable for an on-vehicle display apparatus which includes a display called a flat display such as a liquid crystal display and a practical meter located on a front face of the flat display and having a pointer.

The invention claimed is:

1. An on-vehicle display apparatus, comprising:
   a flat display configured to display various types of information;
   a light-transmitting substrate disposed on a front-face side of the flat display;
   a pointer disposed on the light-transmitting substrate, wherein the light-transmitting substrate is configured to rotatably hold the pointer;
   a pointer drive disposed on a back-face side of the flat display configured to rotate the pointer;
   a movement mechanism configured to move the light-transmitting substrate to inside or outside of a display range; and
   a first magnet provided for the pointer, and a second magnet provided for the pointer drive means to be opposite to the first magnet, wherein, when the light-transmitting substrate is positioned on the front-face side of the flat display inside of the display range, the pointer is rotated in association with rotation drive of the pointer drive by an attraction force of the first and second magnets, and wherein, when the light-transmitting substrate is positioned outside of a display range, the attraction force of the first and second magnets is cancelled.

2. The on-vehicle display apparatus according to claim 1, wherein the pointer has a weight balance configured to point at a predetermined position when the light-transmitting substrate is moved to the outside of the display range by the movement mechanism.

3. The on-vehicle display apparatus according to claim 1, wherein a shaft portion rotatably supporting the pointer is located in the light-transmitting substrate, the shaft portion includes a main shaft, a main-shaft receive portion securing the main shaft to the light-transmitting substrate, a rotation shaft portion rotatably disposed about the main shaft and located on and secured to the pointer, and an elastic member located between the main-shaft receive portion and the rotation shaft portion,
   wherein, when the light-transmitting substrate is positioned on the front-face side of the flat display, the first and second magnets attract each other to deform the elastic member to make the rotation shaft portion rotatable, and when the light-transmitting substrate is moved to the outside of the display range by the movement mechanism, the elastic member is restored to hold the rotation shaft portion non-rotatable.

4. The on-vehicle display apparatus according to claim 3, wherein the main shaft has a holding member in contact with the rotation shaft portion by the action of the elastic member when the light-transmitting substrate is moved to the outside of the display range by the movement mechanism.

5. The on-vehicle display apparatus according to claim 1, wherein each of the first and second magnets has two poles magnetized on a surface opposite to each other, and when the light-transmitting substrate is moved to the outside of the display range by the movement mechanism, the pointer drive means rotates the pointer such that magnetic pole boundaries of the first and second magnets are substantially parallel with the movement direction of the light-transmitting substrate.

6. The on-vehicle display apparatus according to claim 5, wherein the pointer drive means does not perform rotation drive for the time period from the movement of the light-transmitting substrate to the outside of the display range to the return of the first magnet to the position where the attraction is produced with the second magnet.

* * * * *